United States Patent
Kistner et al.

(10) Patent No.: US 9,840,148 B2
(45) Date of Patent: Dec. 12, 2017

(54) CONTROL SYSTEM FOR AT LEAST ONE ELECTRIC MOTOR, USABLE AS A GENERATOR, OF A VEHICLE; AND BRAKING SYSTEM FOR A VEHICLE

(71) Applicant: Robert Bosch GmbH, Stuttgart (DE)

(72) Inventors: Matthias Kistner, Bretzfeld (DE); Otmar Bussmann, Abstatt (DE); Bertram Foitzik, Ilsfeld (DE); Urs Bauer, Sachsenheim (DE); Rolf Ellwein, Sachsenheim (DE); Robert Kaster, White Lake, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 153 days.

(21) Appl. No.: 14/885,560

(22) Filed: Oct. 16, 2015

(65) Prior Publication Data
US 2016/0159223 A1  Jun. 9, 2016

(30) Foreign Application Priority Data
Oct. 16, 2014 (DE) .................... 10 2014 221 036

(51) Int. Cl.
*B60L 7/26* (2006.01)
*B60T 13/58* (2006.01)
*B60T 13/66* (2006.01)

(52) U.S. Cl.
CPC .............. *B60L 7/26* (2013.01); *B60T 13/586* (2013.01); *B60T 13/662* (2013.01)

(58) Field of Classification Search
CPC ......... B60L 7/26; B60T 13/586; B60T 13/662
See application file for complete search history.

(56) References Cited

U.S. PATENT DOCUMENTS

2009/0236903 A1* 9/2009 Nishino ................. B60T 8/442
303/3

* cited by examiner

*Primary Examiner* — Basil T Jos
(74) *Attorney, Agent, or Firm* — Norton Rose Fulbright US LLP; Gerard Messina

(57) ABSTRACT

A control system for an electric motor usable as a generator of a vehicle includes: a first control device and a second control device each configured to define, in consideration of at least one furnished first specification signal with regard to a driver-requested or autonomously requested braking input, at least one target braking torque variable with regard to at least one generator braking torque to be exerted by way of the at least one electric motor on at least one wheel of the vehicle and/or on at least one axle of the vehicle, and to output to the at least one electric motor, and/or to at least one electronic control system of the at least one electric motor, at least one output signal corresponding to the at least one target braking torque variable.

14 Claims, 4 Drawing Sheets

CONTROL SYSTEM FOR AT LEAST ONE ELECTRIC MOTOR, USABLE AS A GENERATOR, OF A VEHICLE; AND BRAKING SYSTEM FOR A VEHICLE

BACKGROUND OF THE INVENTION

1. Field of the Invention

The invention relates to a control system for at least one electric motor, usable as a generator, of a vehicle, and also relates to a braking system for a vehicle.

2. Description of the Related Art

FIG. 1 is a schematic depiction to explain a manner of operation of a conventional braking system of a hybrid vehicle or electric vehicle.

The conventional braking system schematically reproduced in FIG. 1 is installed nowadays in a variety of hybrid vehicles (for example in a Mercedes S-class hybrid or a BMW 5-series hybrid). The conventional braking system has an electric motor 10 usable as a generator. Control can be applied to electric motor 10, by way of a microcontroller 12 and an inverter controller 14, in such a way that a generator braking torque Mgen can be exerted by way of electric motor 10 on at least one wheel 16 of the vehicle equipped with the conventional braking system, or on at least one of its vehicle axles.

Microcontroller 12 defines a target braking torque variable Mgen0 corresponding to the generator braking torque Mgen, the target braking torque variable Mgen0 being defined in consideration of a furnished specification signal 18 with regard to a driver-requested braking input and of at least one furnished wheel rotation speed signal 20 with regard to at least one wheel rotation speed of the at least one wheel 16 of the vehicle. Microcontroller 12 then outputs to inverter controller 14 the target braking torque variable Mgen0 that has been defined. Inverter controller 14 then applies control to electric motor 10 by way of a control signal 22 in accordance with the previously defined target braking torque variable Mgen0. (In the conventional braking system of FIG. 1, the specification signal 18 is furnished to microcontroller 12 by a pedal travel sensor 26 linked to a brake pedal 24 of the braking system.)

Microcontroller 12 and inverter controller 14 are supplied with a battery voltage $U_B$ from a vehicle battery 28. Electric motor 10, on the other hand, is supplied with a high voltage $U_{HV}$ from a vehicle-internal high-voltage source 30.

BRIEF SUMMARY OF THE INVENTION

The invention creates a control system for a braking system of a vehicle, and a braking system, equipped therewith, of a vehicle, the control system according to the present invention being capable, because it is equipped with the second control device, of reacting more advantageously to a failure or functional impairment of its first control device and to a failure or functional impairment of at least one further component of the vehicle equipped therewith. As will be explained in more detail below, the control system according to the present invention can often still continue to ensure reliable operation of the at least one electric motor usable as a generator, for secure braking of the vehicle equipped therewith, when a conventional control system is already incapable of functioning, for example due to a failure of an essential braking system component, or of a sub-unit within the control system, or of its power supply.

The present invention thus improves the driving convenience and safety standard of any vehicle equipped therewith.

Conventionally, in the context of a failure of an essential component of the braking system, a failure of a sub-unit within the control system, or a failure of its power supply, a control unit according to the existing art at least temporarily does not apply control to the at least one electric motor usable as a generator. In the context of the existing art, the electric motor usable as a generator thus also cannot react to requests from the first control unit for recuperation. Instead, the respective electric motor can at best recover a predetermined braking torque as a fallback level in coasting mode (while there is no actuation of a gas pedal). When specifying this braking torque, however, consideration must be given to the fact that the predetermined braking torque must not trigger locking of the wheels of the vehicle that is to be decelerated. Conventionally, therefore, upon a failure of an essential braking system component, of a sub-unit within the control system, or of the power supply of the control unit according to the existing art, the driver must apply a comparatively large driver braking force in order to decelerate his or her vehicle, in order to compensate for or bypass the almost entirely absent usability of the electric motor, usable as a generator, of his or her vehicle.

The present invention, in contrast, because the control system is equipped with the second control device (in addition to the first control device), creates two independent devices or units that are embodied to evaluate a requested braking input, to define the at least one corresponding target braking torque variable, and correspondingly to apply control to the at least one electric motor usable as a generator. An application of control, corresponding to the braking input, to the at least one electric motor usable as a generator is thus still ensured even in one of the failure situations enumerated above. A braking performance of the at least one electric motor can thus be further improved even on the fallback level by way of the present invention.

In particular, the generator braking torque brought about by way of the at least one electric motor can be further increased even on the fallback level.

In an advantageous embodiment of the control system, the first control device is additionally designed to apply control to at least one hydraulic component of the braking system. The second control device can accordingly also be designed for additional application of control to the at least one hydraulic component of the braking system. The number of electronic control systems to be installed on the braking system can be reduced thanks to this multifunctionality of the first control device or second control device. This permits a space-saving embodiment of all electronic control systems of the braking system, and additionally reduces the work that must be performed in order to install them on the braking system. The manufacturing costs of the correspondingly embodied braking system can thereby also be reduced.

In a further advantageous embodiment of the control system, the first control device has a master status and the second control device has a slave status. Advantageous interaction of the first control device with the second control device is thereby reliably ensured.

Preferably at least the first control device is designed to define the at least one target braking torque variable in additional consideration of at least one furnished first wheel rotation speed signal with regard to at least one wheel rotation speed of the at least one wheel of the vehicle. The second control device can accordingly also be designed to define the at least one target braking torque variable in additional consideration of the at least one furnished first wheel rotation speed signal, and/or of at least one furnished second wheel rotation speed signal, with regard to the at least one wheel rotation speed of the at least one wheel of the vehicle. In this case the at least one electric motor usable as a generator can be operated, in a plurality of situations occurring in the braking system, in such a way that locking of the at least one wheel is preventable or, if it nevertheless occurs, can quickly be remedied by appropriate application of control to the at least one electric motor.

For example, the first control device can be integrated into a first microcontroller, and the second control device can be integrated into a second microcontroller. In supplementary fashion, the first microcontroller and second microcontroller can be integrated into one circuit board.

The microcontroller having the integrated first control device and the microcontroller having the integrated second control device can in particular be connected to one another via an internal interconnection. In this case a data transfer between the first control device and the second control device is possible via the internal interconnection. Ensuring this data transfer between the first control device and the second control device makes it possible to reduce a wiring complexity for ensuring signal transfer between both control devices and at least one sensor, and/or signal transfer between both control devices and the at least one electric motor usable as a generator, or its at least one electronic control system.

In an advantageous refinement of the control system, the first control device is connectable to a first energy supply apparatus, and the second control device is connectable to a second energy supply apparatus. In this case a failure or functional impairment of the first energy supply apparatus has no effect on the functionality at least of the second control device.

For example, the first control device can be connectable to a vehicle battery constituting the first energy supply apparatus, and the second control device can be connectable to a high-voltage source constituting the second energy supply apparatus. Because the at least one electric motor usable as a generator is as a rule connected to the high-voltage source, in this case the second control device and the at least one electric motor can still interact, even after a failure of the vehicle battery, for safe deceleration of the vehicle equipped therewith using less driver braking force.

In this case the second control device is preferably connectable to the second energy supply apparatus via a DC voltage converter integrated into the second control device. Reliable operation of the second control device at least in the context of a functional failure of the first control device is still reliably ensured in this case.

The advantages described above are also achieved in a braking system for a vehicle having a control system of this kind.

In an advantageous embodiment of the braking system, the braking system has at least one sensor that is respectively designed both to output to the first control device the at least one first specification signal with regard to the driver-requested braking input, and to output to the second control device the at least one second specification signal with regard to the driver-requested braking input, the respective sensor encompassing a first sensor chip with which the at least one first specification signal is outputtable, and a second sensor chip with which the at least one second specification signal is outputtable. A failure of the first control device due to a functional impairment of the first sensor chip can thus easily be bypassed by way of the second sensor chip and the second control device. In addition, in this case the at least one sensor equipped respectively with the first sensor chip and the second sensor chip has a relatively small installation space requirement despite its advantageous multifunctionality.

As an alternative to the embodiment described above, the braking system can also have at least one first sensor that is designed to output to the first control device the at least one first specification signal with regard to the driver-requested braking input, and at least one second sensor that is designed to output to the second control device the at least one second specification signal with regard to the driver-requested braking input. In this case as well, a functional failure of the first control device due to a functional impairment of the first sensor can easily be bypassed by way of the second sensor and the second control device.

DETAILED DESCRIPTION OF THE INVENTION

Figure 1:
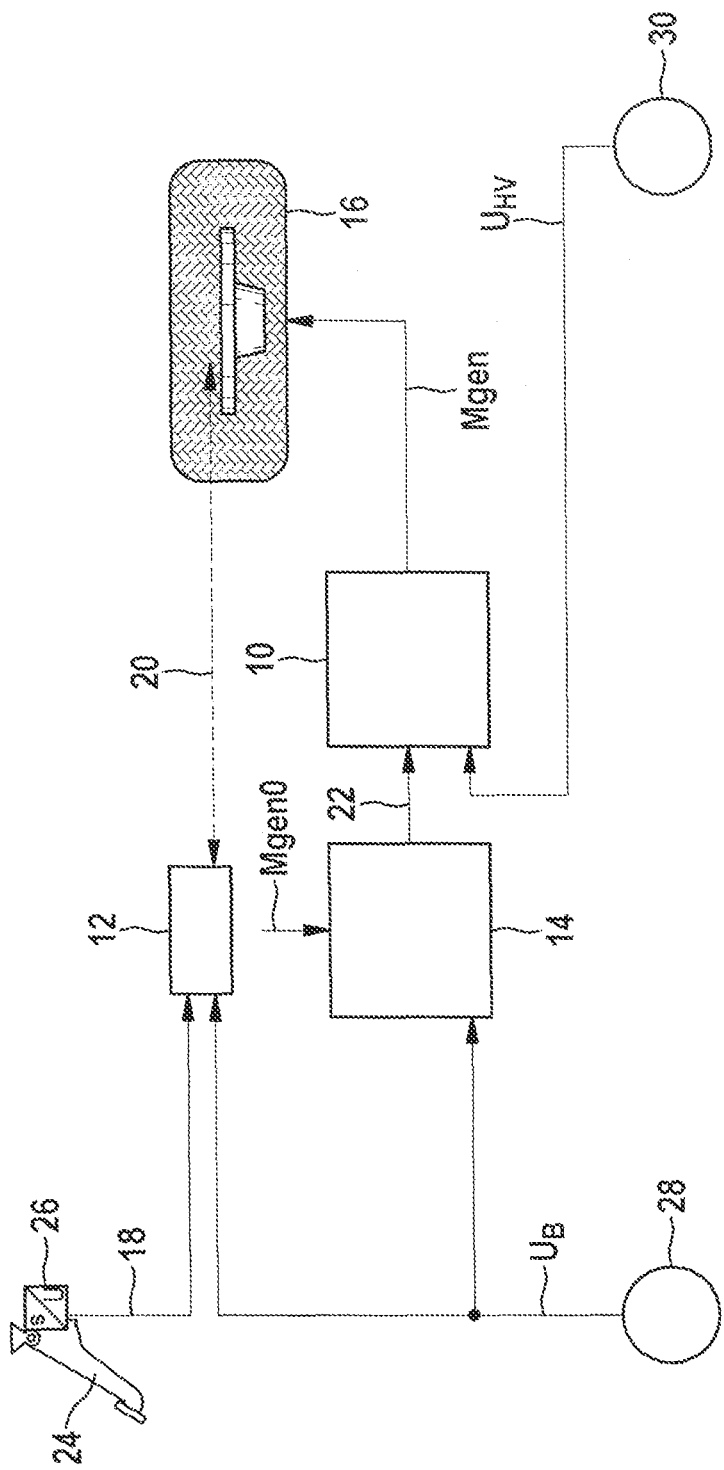
FIG. 1 is a schematic depiction to explain a manner of operation of a conventional braking system.
Figure 2:
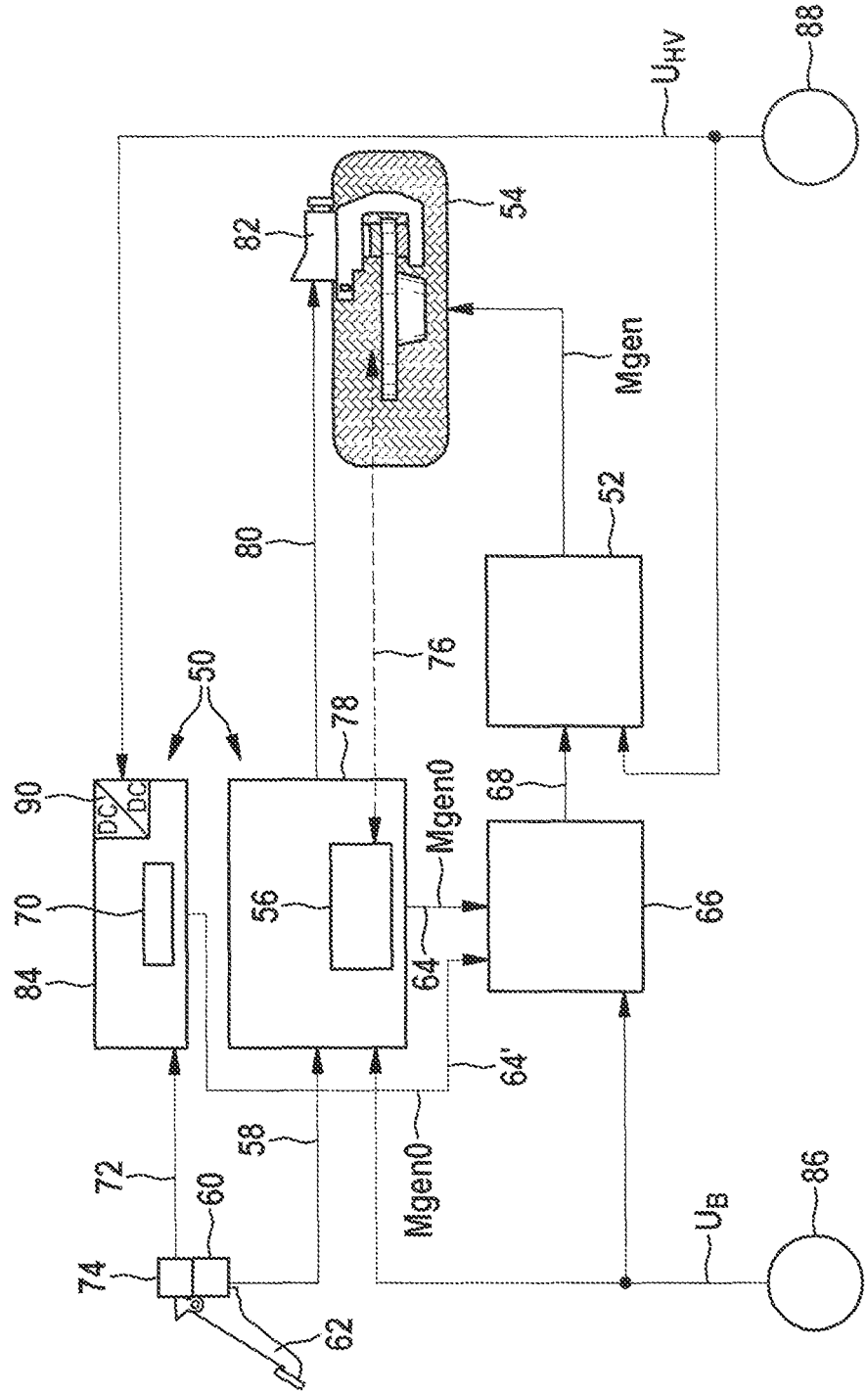
FIG. 2 schematically depicts a first embodiment of the control system.

FIG. 2 schematically depicts a first embodiment of the control system.

Control system 50 schematically reproduced in FIG. 2 is designed to apply control to at least one electric motor 52, usable as a generator, of the braking system, equipped with control system 50, of a vehicle or motor vehicle. The vehicle equipped with control system 50 can be, for example, an electric or hybrid vehicle. It is noted, however, that the usability of control system 50 is not limited to a specific type of vehicle or motor vehicle.

By way of the at least one electric motor 52 usable as a generator, at least one generator braking torque Mgen can be exerted on at least one associated wheel 54 of the vehicle or motor vehicle, or on at least one vehicle axle of the vehicle or motor vehicle. The at least one electric motor 52 can additionally also be usable as an electric drive motor of the vehicle or motor vehicle. It is noted, however, that the usability of control system 50 is not confined to a specific type of motor of the at least one electric motor 52.

Control system 50 encompasses a first control device 56 with which at least one target braking torque variable Mgen0, with regard to the at least one generator braking torque Mgen to be exerted (by way of the at least one electric motor 52) on the at least one wheel 52 and/or on the at least one axle, is definable. First control device 56 is designed to define the at least one target braking torque variable Mgen0 in consideration of at least one furnished first specification signal 58 with regard to a driver-requested or autonomously requested braking input. As a rule, a first specification signal 58 of this kind indicates a driver-requested or autonomously requested braking intensity of the driver-requested or autonomously requested braking input.

In the embodiment of FIG. 2, the braking system equipped with control system 50 has at least one first sensor 60 that is designed to output to first control device 56 the at least one first specification signal 58 with regard to the driver-requested braking input. The at least one first sensor 60 can be, for example, a pedal travel sensor, a rod travel sensor, a differential travel sensor, and/or a driver braking force sensor. A differently configured sensor apparatus for ascertaining the driver-requested braking input can also be used as the at least one first sensor 60. The direct connection, reproduced in FIG. 2, of the at least one first sensor 60 to a brake actuation element 62 of the braking system, in particular to a brake pedal 62, is to be interpreted merely as an example. It is noted that the at least one specification signal 58 can be outputted to first control device 56 by an automatic speed control system (e.g. an automatic cruise control system or ACC) and/or by an emergency braking system of the vehicle or motor vehicle.

The at least one target braking torque variable Mgen0 definable by way of first control device 56 can be, for example, a target generator braking torque to be exerted at least on the at least one wheel 54 and/or on the at least one vehicle axle. As an alternative or in addition thereto, the at least one target braking torque variable Mgen0 can also be at least one target operating mode of the at least one electric motor 52 and/or at least one variable characterizing the at least one target operating mode of the at least one electric motor 52, for example at least one voltage to be furnished and/or at least one current intensity to be furnished. Once the at least one target braking torque variable Mgen0 has been defined, first control device 56 outputs at least one output signal 64 corresponding to the at least one target braking torque variable Mgen0 (or the at least one output signal 64 having the at least one target braking torque variable Mgen0) to the at least one electric motor 52 or to at least one electronic control system 66 of the at least one electric motor 52. In the embodiment of FIG. 2, for example, the first control device outputs the at least one output signal 64 (having the at least one target braking torque variable Mgen0) to an inverter controller 66 constituting the at least one electronic control system 66 of the at least one electric motor 52. Inverter controller 66 then applies control to the at least one electric motor 52 using at least one corresponding motor control signal 68, in such a way that at least a generator braking torque Mgen corresponding to the at least one defined target braking torque variable Mgen0 can be brought about by way of the at least one electric motor 52 for generator-mode braking of the vehicle.

Control system 50 also has a second control device 70. Second control system 70 is designed, at least in the context of a functional failure of first control device 56, to define the at least one target braking torque variable Mgen0 and to output to the at least one electric motor 52, or to the at least one electronic control system 66 of the at least one electric motor 52, the at least one corresponding output signal 64' (or the at least one output signal 64' having the at least one target braking torque variable Mgen0). Definition of the at least one target braking torque variable Mgen0 by way of second control device 70 is accomplished in consideration of the at least one furnished first specification signal 58 and/or at least one furnished second specification signal 72 with regard to the driver-requested or autonomously requested braking input.

Braking system 50 can react to the functional failure of first control device 56, or to an event triggering the functional failure of first control device 56, with a utilization of second control device 70 such that second control device 70 takes over, in place of first control device 56, the defining of the at least one target braking torque variable Mgen0 and the outputting of the at least one corresponding output signal 64'. The functional failure of first control device 56, or the event triggering the functional failure of first control device 56, can thus be bypassed by way of second control device 70. In particular, despite the functional failure of first control device 56, the at least one generator braking torque Mgen brought about by the at least one electric motor 52 can continue to be adapted to the driver-requested or autonomously requested braking input. A relatively large proportion of the driver-requested or autonomously requested braking input can therefore still be provided by way of the at least one electric motor 52 even in the context of a functional failure of first control device 56.

In addition, even upon a functional failure of first control device 56, or in the context of an event triggering the functional failure of first control device 56, control can be applied to the at least one electric motor 52 by way of second control device 70 in such a way that the at least one generator braking torque Mgen thereby brought about does not result in locking of a wheel 54 that is to be braked. Second control device 70 can furthermore also adapt the at least one generator braking torque Mgen brought about by way of the at least one electric motor 52 to a decreasing speed of the vehicle equipped with control system 50, in such a way that the vehicle is not under-braked. The result is that even in the context of a functional failure of first control device 56, or in the event of an event triggering the functional failure of first control device 56, the at least one generator braking torque Mgen brought about by way of the at least one electric motor 52 is metered so as to ensure that the driver is effectively relieved of effort upon braking of his or her vehicle, and at the same time to ensure good steerability and sufficient stability for the vehicle that is to be braked.

Equipping braking system 50 with second control device 70, and the advantageous design thereof, thus relieves the driver of the vehicle, in the context of a functional failure of first control device 56, of the conventional need to brake the vehicle in such a situation exclusively by way of his or her driver braking force. Instead, even in the context of a functional failure of first control device 56, or in the context of the event triggering the functional failure of first control device 56, the vehicle can be braked (for a driver-requested braking input) using a lesser driver braking force, and (for an autonomously requested braking input) within the context defined by the generator with no expenditure of work by the driver. Equipping braking system 50 with second control device 70, and the advantageous design thereof, thus significantly further improves the driver's driving convenience even on this fallback level.

It is expressly noted that in contrast to the conventional coasting mode of a generator according to the existing art (in the absence of a gas pedal actuation), when control system 50 is used, there is no risk that the steerability or stability of the vehicle or motor vehicle may be lost. Instead, even in the context of a functional failure of first control device 56, or in the context of the event triggering the functional failure of first control device 56, greater braking performance can be called up by the control unit of the generator because the meterability of the at least one generator braking torque Mgen continues to be guaranteed by braking system 50.

First control device 56 can be connected to a vehicle bus. A fault in a bus module can in this case trigger a degradation of first control deice 56, but the degradation of first control device 56 can reliably be compensated for or bypassed by way of second control device 70.

In the embodiment of FIG. 2, the at least one second specification signal 72 is outputtable to second control device 70, by way of example, via at least one second sensor 74. The at least one second specification signal 72 can reproduce a (requested) braking intensity of the driver-requested or autonomously requested braking input. The at least one second sensor 74 can also be a pedal travel sensor, a rod travel sensor, a differential travel sensor, and/or a driver braking force sensor. A differently configured sensor apparatus for ascertaining the driver-requested braking input can also be used as the at least one second sensor 74. The at least one second specification signal 72 can furthermore also be furnished to second control device 70 by the automatic speed control system and/or by the automatic braking system of the vehicle or motor vehicle.

In the embodiment of FIG. 2, first control device 56 is designed in supplementary fashion to define the at least one target braking torque variable Mgen0 in additional consideration of at least one furnished (first) wheel rotation speed signal 76 with regard to at least one wheel rotation speed of the at least one wheel 54 of the vehicle. In this embodiment, stability and steerability are ensured thanks to the capability for metering by the driver; automatic compensation via the wheel rotation speed signals cannot occur. This limits the maximally usable braking torque via the generator, in particular in the context of autonomously requested decelerations.

In the embodiment of FIG. 2, first control device 56 is, by way of example, integrated into a first microcontroller 56. Second control device 70, on the other hand, is integrated into a second microcontroller 70 (embodied externally from first microcontroller 56). First microcontroller 56 is disposed inside a control unit 78.

First control device 56 or control unit 78 is furthermore preferably designed for additional application of control to at least one hydraulic component (not depicted) of the braking system equipped with control system 70. The at least one hydraulic component to which control can be applied by way of at least one hydraulic control signal 80 of first control device 56 or of control unit 78 can be, for example, at least one valve (in particular at least one isolation valve, at least one switchover valve, at least one high-pressure switching valve, at least one wheel inlet valve, and/or at least one wheel outlet valve), at least one motor of a piston/cylinder apparatus, and/or at least one pump motor. First control device 56 or control unit 78 can especially be usable as an ESP control unit 78. Preferably, control can be applied to the at least one hydraulic component of the braking system by way of the at least one hydraulic control signal 80 in such a way that at least one brake pressure (previously defined by first control device 56 or control unit 78) can be established in at least one wheel brake cylinder 82 of the braking system.

In the embodiment of FIG. 2, second microcontroller 70 having second control device 70 is integrated into a further control unit 84. In a refinement, second control device 70 or further control unit 84 can also be designed to perform the additional functions described in the preceding paragraph. In an alternative embodiment, second control device 70 can also be integrated into the at least one electronic control system 66 of the at least one electric motor 52 or inverter 66. First microcontroller 56 and second microcontroller 70 can likewise also be integrated into one common circuit board or one common control unit.

A fault in inverter 66, in particular a functional failure of inverter 66, can also be capable of being compensated for by way of at least one of components 56, 70, 78, and 84. For example, at least one of components 56, 70, 78, and 84 can be designed so that it applies control, in the context of a fault in inverter 66 or a functional failure of inverter 66, to the at least one hydraulic component of the braking system in order to build up a higher brake pressure in the at least one wheel brake cylinder 82.

First control device 56 or control unit 78 is furthermore connectable or connected to a first energy supply apparatus 86, and second control device 70 or further control unit 84 is connectable or connected to second energy supply apparatus 88. While first control device 56 is supplied with energy from first energy supply apparatus 86, second control device 70 can be supplied with energy from second energy supply apparatus 88. A functional failure of first energy supply apparatus 86 which results in functional failure of first control device 56 can thus easily be bypassed by way of second energy supply apparatus 88 and second control device 70. A failure of second energy supply apparatus 88, on the other hand, has no effect at all on the manner of operation of first control device 56.

For example, first control device 56 or control unit 78 is connected to a vehicle battery 86, constituting first energy supply apparatus 86, in such a way that a battery voltage $U_B$ can be furnished to first control device 56. Inverter 66 can also be connected to vehicle battery 86. Second control device 70 or further control unit 84 is connectable or connected to a high-voltage source 88 constituting second energy supply apparatus 88. As a rule, high-voltage source 88 is used in order to furnish a high voltage $U_{HV}$ to the at least one electric motor 52. The connection of second control device 70 to high-voltage source 88 thus enhances the usability of high-voltage source 88 that is already present in the vehicle.

In the embodiment of FIG. 2, second control device 70 or further control unit 84 is connectable or connected to second energy supply apparatus 88 via a DC voltage converter 90 integrated into second control device 70 or into further control unit 84. The high voltage $U_{HV}$ furnished by high-voltage source 88 to second control device 70 or to further control unit 84 is thus reliably convertible into a DC voltage suitable for second control device 70.

Figure 3:
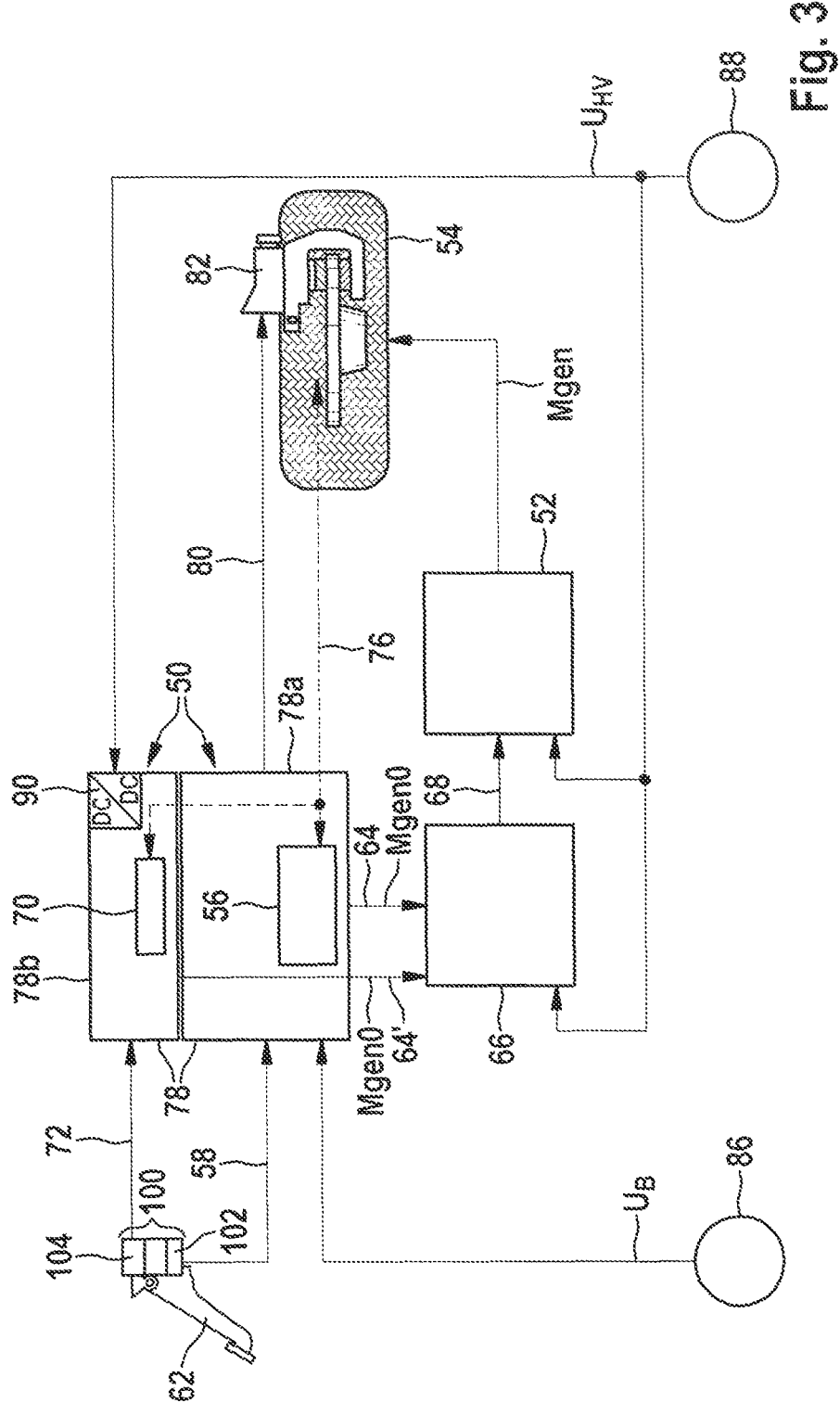
FIG. 3 schematically depicts a second embodiment of the control system.

FIG. 3 schematically depicts a second embodiment of the control system.

Control system 50 schematically reproduced in FIG. 3 is integrated into a (single) control unit 78; by way of example, microcontroller 56 having first controlling unit 56 is disposed in a first sub-unit 78a of control unit 78a, and microcontroller 70 having second control device 70 is disposed in a second sub-unit 78b of control unit 78. The at least one (first) wheel rotation speed signal 76 furnished to first control device 56 can thus also, in simple fashion, be outputted to second control device 70. Additional wiring outlay for furnishing the at least one (first) wheel rotation speed signal 76 to second control device 70 is eliminated in this case. Second control device 70 can thus also be designed to define the at least one target braking torque variable Mgen0 in additional consideration of the at least one furnished (first) wheel rotation speed signal 76. This is possible even if control devices 56 and 70 are not disposed in different sub-units 78a and 78b of the (single) control device 78.

As a supplement or alternative thereto, in another embodiment of control system 50 second control device 70 can also be designed to define the at least one target braking torque variable Mgen0 in additional consideration of at least one furnished second wheel rotation speed signal with regard to the at least one wheel rotation speed of the at least one wheel 54 of the vehicle. In this case the at least one first wheel rotation speed signal 76 is furnished to first control device 56, while second control device 70 receives the at least one second wheel rotation speed signal. In particular, the at least one first wheel rotation speed signal 76 can be conveyable via a first conductor path and the at least one second wheel rotation speed signal can be conveyable via a second conductor path.

The braking system depicted in FIG. 3 furthermore has at least one sensor 100 that is respectively designed both to output to first control device 56 the at least one specification signal 58 with regard to the driver-requested braking input, and to output to second control device 70 the at least one second specification signal 72 with regard to the driver-requested braking input. The respective sensor 100 encompasses a first sensor chip 102 with which the at least one first specification signal 58 can be outputted, and a second sensor chip 104 (installed together with first sensor chip 102 in the same sensor 100) with which the at least one second specification signal 72 can be outputted. The expanded functionality of the at least one sensor 100 can thus be embodied without significantly increasing its installation space requirement.

In the embodiment of FIG. 3, the at least one electronic control system 66 of the at least one electric motor 52 is moreover also connected to high-voltage source 88.

Figure 4:
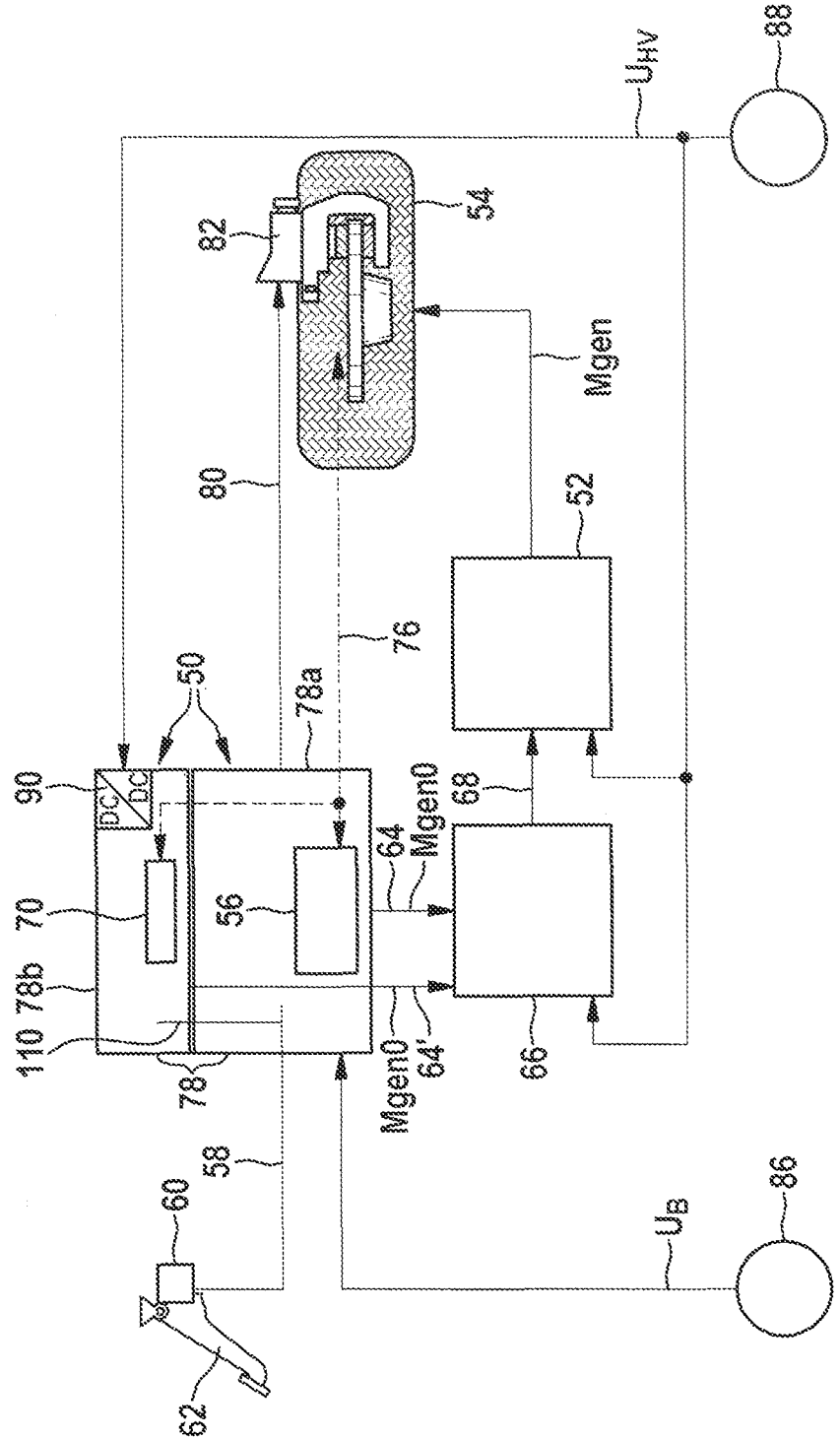
FIG. 4 schematically depicts a third embodiment of the control system.

FIG. 4 schematically depicts a third embodiment of the control system.

In control system 50 depicted in FIG. 4, microcontroller 56 having the integrated first control device 56, and microcontroller 70 having the integrated second control device 70, are connected to one another via an internal interconnection 110. The at least one (first) specification signal 58 with regard to a driver-requested and/or autonomously requested braking input can thus be outputted with little complexity to both control devices 56 and 70.

In an alternative embodiment of control system 50, first control device 56 and second control device 70 can also be integrated into one circuit board. A control system 50 of this kind has not, however, been graphically depicted here.

It is noted that the connection, shown in the above embodiments, of first control device 56 and of second control device 70 to different energy supply apparatuses 86 and 88 is to be interpreted merely by way of example. If desired, first control device 56 and second control device 70 can also be capable of being supplied with energy from the same power supply apparatus 86 or 88.

In all the embodiments described above, first control device 56 can have a master status and second control device 70 can have a slave status. Upon occurrence of a fault in first control device 56 (having master status), second control device 70 can automatically take over a plurality of functions of first control device 56. Occurrence of a fault in second control device 70 (having slave status), conversely, has little or no negative effect on first control device 56. First control device 56 instead generally continues to operate with its full functionality, unimpaired by the occurrence of the fault in second control device 70.

All the above-described control systems 50 are easily installable on a braking system. The respective control system 50 can be mounted, for example, on a hydraulic unit of the braking system.

What is claimed is:

1. A control system for at least one electric motor usable as a generator of a vehicle, comprising:
a first control device configured to define, in consideration of at least one furnished first specification signal with regard to one of a driver-requested or autonomously requested braking input, at least one target braking torque variable with regard to at least one generator braking torque to be exerted by way of the at least one electric motor on at least one of (i) at least one wheel of the vehicle and (ii) at least one axle of the vehicle; and the first control device is further configured to output at least one output signal corresponding to the at least one target braking torque variable to at least one of (i) the at least one electric motor and (ii) at least one electronic control system of the at least one electric motor; and
a second control device configured to define, at least in the case of a functional failure of the first control device, the at least one target braking torque variable in consideration of at least one of the at least one furnished first specification signal and at least one furnished second specification signal with regard to one of the driver-requested or autonomously requested braking input, and to output the at least one corresponding output signal to at least one of (i) the at least one electric motor, and (ii) the at least one electronic control system of the at least one electric motor.

2. The control system as recited in claim 1, wherein the first control device is additionally configured to apply control to at least one hydraulic component of the braking system.

3. The control system as recited in claim 1, wherein the first control device has a master status and the second control device has a slave status.

4. The control system as recited in claim 1, wherein at least the first control device is configured to define the at least one target braking torque variable in additional consideration of at least one furnished first wheel rotation speed signal with regard to at least one wheel rotation speed of the at least one wheel of the vehicle.

5. The control system as recited in claim 4, wherein the second control device is configured to define the at least one target braking torque variable in additional consideration of at least one of the at least one furnished first wheel rotation speed signal and at least one furnished second wheel rotation speed signal with regard to the at least one wheel rotation speed of the at least one wheel of the vehicle.

6. The control system as recited in claim 4, wherein the first control device is integrated into a first microcontroller, and the second control device is integrated into a second microcontroller.

7. The control system as recited in claim 6, wherein the first microcontroller and the second microcontroller are integrated into one circuit board.

8. The control system as recited in claim 6, wherein the first microcontroller having the integrated first control device and the second microcontroller having the integrated second control device are connected to one another via an internal interconnection.

9. The control system as recited in claim 4, wherein the first control device is connected to a first energy supply apparatus and the second control device is connected to a second energy supply apparatus.

10. The control system as recited in claim 9, wherein the first control device is connected to a vehicle battery constituting the first energy supply apparatus and the second control device is connected to a high-voltage source constituting the second energy supply apparatus.

11. The control system as recited in claim 10, wherein the second control device is connected to the second energy supply apparatus via a DC voltage converter integrated into the second control device.

12. A braking system for a vehicle, comprising:
a control system of a least one electric motor usable as a generator of the vehicle, the control system including:
  a first control device configured to define, in consideration of at least one furnished first specification signal with regard to one of a driver-requested or autonomously requested braking input, at least one target braking torque variable with regard to at least one generator braking torque to be exerted by way of the at least one electric motor on at least one of (i) at least one wheel of the vehicle and (ii) at least one axle of the vehicle, and the first control device is further configured to output at least one output signal corresponding to the at least one target braking torque variable to at least one of (i) the at least one electric motor and (ii) at least one electronic control system of the at least one electric motor; and
a second control device configured to define, at least in the case of a functional failure of the first control device, the at least one target braking torque variable in consideration of at least one of the at least one furnished first specification signal and at least one furnished second specification signal with regard to one of the driver-requested or autonomously requested braking input, and to output the at least one corresponding output signal to at least one of (i) the at least one electric motor, and (ii) the at least one electronic control system of the at least one electric motor.

13. The braking system as recited in claim 12, further comprising:
at least one sensor configured to (i) output to the first control device the at least one first specification signal with regard to the driver-requested braking input, and (ii) output to the second control device the at least one second specification signal with regard to the driver-requested braking input, the at least one sensor having a first sensor chip with which the at least one first specification signal is output and a second sensor chip with which the at least one second specification signal is output.

14. The braking system as recited in claim 12, further comprising:
at least one first sensor outputting to the first control device the at least one first specification signal with regard to the driver-requested braking input; and
at least one second sensor outputting to the second control device the at least one second specification signal with regard to the driver-requested braking input.

* * * * *